US008413942B2

(12) United States Patent
Ward

(10) Patent No.: US 8,413,942 B2
(45) Date of Patent: Apr. 9, 2013

(54) ADJUSTABLE SUSPENSION SYSTEM FOR A SEAT

(75) Inventor: Wayne Ward, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 1248 days.

(21) Appl. No.: 12/101,193

(22) Filed: Apr. 11, 2008

(65) Prior Publication Data
US 2009/0256293 A1 Oct. 15, 2009

(51) Int. Cl.
F16M 13/00 (2006.01)
(52) U.S. Cl. .................... 248/419; 248/157
(58) Field of Classification Search .............. 296/65.01, 296/65.18; 297/358, 354.12, 353; 248/157, 248/419, 421, 424
See application file for complete search history.

(56) References Cited

U.S. PATENT DOCUMENTS

| 3,994,469 | A | | 11/1976 | Swenson et al. | |
|---|---|---|---|---|---|
| 4,198,092 | A | | 4/1980 | Federspiel | |
| 4,363,377 | A | | 12/1982 | Van Gerpen | |
| 4,822,094 | A | | 4/1989 | Oldfather et al. | |
| 5,060,959 | A | | 10/1991 | Davis et al. | |
| 5,169,112 | A | * | 12/1992 | Boyles et al. | 248/550 |
| 6,000,703 | A | * | 12/1999 | Schubert et al. | 280/5.518 |
| 6,193,297 | B1 | * | 2/2001 | Vandermolen | 296/68.1 |
| 6,371,459 | B1 | | 4/2002 | Schick et al. | |
| 6,572,193 | B2 | | 6/2003 | Downes | |
| 6,773,049 | B2 | | 8/2004 | Rupiper et al. | |
| 6,776,384 | B2 | | 8/2004 | Igarashi | |
| 6,886,650 | B2 | * | 5/2005 | Bremner | 180/89.13 |
| 6,916,057 | B2 | | 7/2005 | Teich | |
| 6,945,505 | B2 | | 9/2005 | Hohnl et al. | |
| 7,168,671 | B2 | | 1/2007 | Bostrom et al. | |
| 7,185,867 | B2 | | 3/2007 | Hill et al. | |
| 7,575,206 | B2 | * | 8/2009 | Meier et al. | 248/161 |
| 2002/0125754 | A1 | | 9/2002 | Downes | |
| 2004/0075291 | A1 | | 4/2004 | Rupiper et al. | |
| 2004/0164598 | A1 | | 8/2004 | Teich | |
| 2005/0116132 | A1 | * | 6/2005 | Sakamaki | 248/424 |
| 2005/0269847 | A1 | | 12/2005 | Irish et al. | |
| 2006/0237885 | A1 | | 10/2006 | Paillard et al. | |
| 2006/0238014 | A1 | | 10/2006 | Donaghey | |
| 2007/0278377 | A1 | | 12/2007 | Moorhouse et al. | |
| 2010/0179730 | A1 | * | 7/2010 | Hiemenz et al. | 701/45 |

* cited by examiner

Primary Examiner — Alfred J Wujciak

(57) ABSTRACT

An adjustable vehicle seat suspension system comprising a support assembly, a regulating system, and a control system. In an exemplary embodiment, the control system, which can comprise a hardware control for setting-selection by a human operator, directs the regulating system to adjust the support assembly as needed. Based on the human operator's chosen settings, the regulating system, in conjunction with the support assembly, can emulate a passive, semi-active, or active suspension. Preferably, the regulating system comprises a rotary motor, which drives the support assembly.

12 Claims, 4 Drawing Sheets

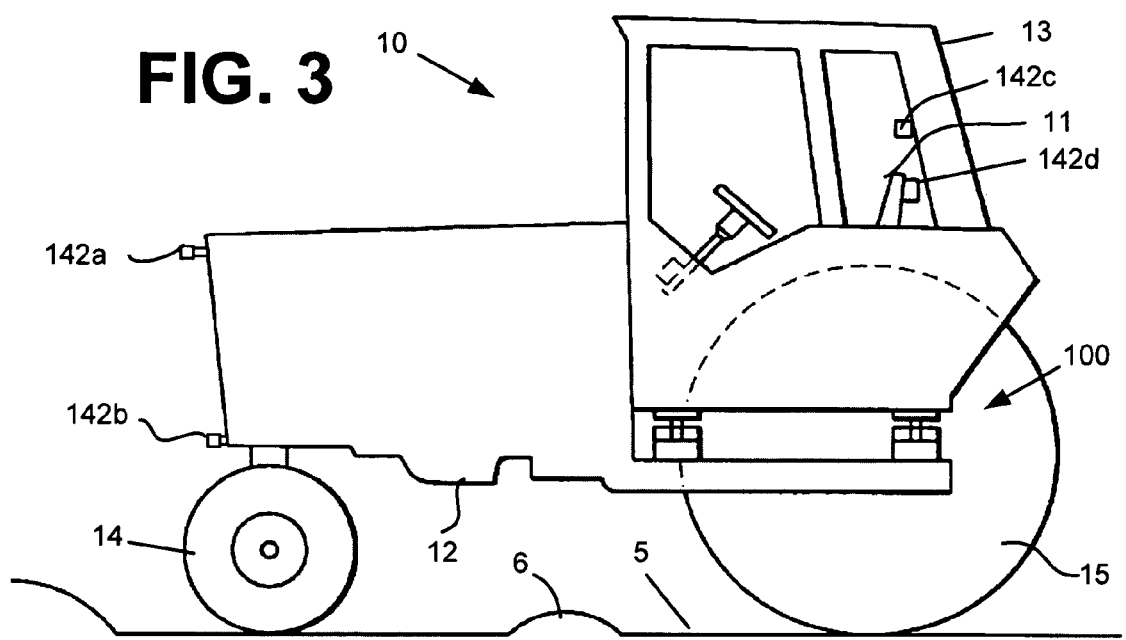
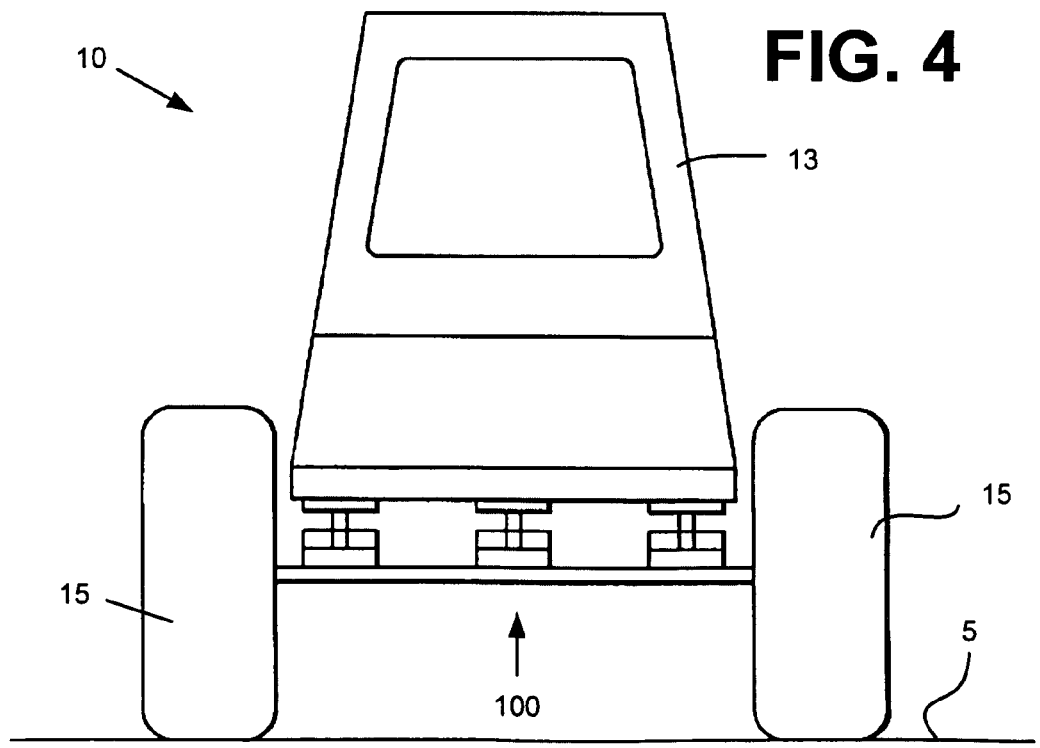

ADJUSTABLE SUSPENSION SYSTEM FOR A SEAT

BACKGROUND

1. Technical Field of the Invention

The present invention relates generally to the field of suspension systems, and more specifically, to an adjustable suspension system for a seat.

2. Description of Related Art

The ride quality and operator comfort of a work vehicle is adversely affected by vibrations or movement transmitted from the frame or chassis of the vehicle to the operator's cab. As the work vehicle travels across a surface, movement of the chassis induces the operator's cab to pitch, roll, and bounce. Movement of the cab can be particularly severe in agricultural and construction equipment vehicles because such vehicles typically operate on off-road surfaces or fields having a high level of bumpiness.

Operator comfort may also be adversely affected by the operation of various systems on a work vehicle. In particular, operation of various work vehicle systems can cause forces to be applied to the chassis of the vehicle which, in turn, are transmitted to the cab. Examples of these forces, which can cause the cab to pitch or roll, include the following: draft forces exerted on the hitch of an agricultural tractor by an implement (e.g., a plow); normal forces applied to a work vehicle as the vehicle turns in response to a steering device; clutch forces generated when a work vehicle clutch (e.g., a main drive clutch, four-wheel drive clutch) is engaged or disengaged; gear shift forces generated when a transmission of a work vehicle is shifted; braking forces generated as brakes of a work vehicle are operated; and acceleration forces generated when a speed actuator changes the speed of a work vehicle.

The movement of the cab caused by surface bumps and the operation of vehicle systems cause both qualitative and quantitative problems. An operator of such a vehicle experiences increased levels of discomfort and fatigue caused by the vibrations. Productivity is decreased when an operator is forced to rest or shorten the work day or is unable to efficiently control the work vehicle. The operator is also less likely to be satisfied with a work vehicle which provides poor ride quality. Under certain conditions, the frequency and magnitude of cab movement may force the operator to decrease driving speed, thereby further decreasing productivity.

To improve ride quality and operator comfort, work vehicles have been equipped with passive, semi-active, or active suspension systems to isolate the operator from vibrations caused by surface bumps. Such systems include vibration isolators mounted between the chassis and cab or seat. Passive systems use passive vibration isolators, such as rubber isolators, springs with friction, or viscous dampers, to damp vibrations, with different isolators used to damp different frequencies. Rubber isolators may be used, for example, to dampen high frequency vibrations, and air bags used to damp low frequency vibrations. Performance of passive systems, however, is limited due to design compromises needed to achieve good control at resonance frequencies and good isolation at high frequencies.

Semi-active systems achieve control and isolation between the chassis and the cab by controlling a damper to selectively remove energy from the system in response to movement of the cab sensed by sensors. Thus, in semi-active systems, the functional principle generally comprises modifying in real time the dampening of the suspension according to magnitudes, such as position, velocity, and acceleration, which are measured in real time by sensors placed on the suspension.

An active seat suspension system responds to motions of the vehicle by actively moving the vehicle seat in a direction and by an amount so as to compensate for such motions. Active systems use sensors to sense cab movement and a controller to generate control signals for an actuator, which applies a force to the cab to cancel vibrations transmitted to the cab by the chassis. The power needed to apply the force is typically supplied by an external source, such as a hydraulic pump. Unfortunately, hydraulic pumps, while common in the art, are associated with inefficiencies and high emissions.

A number of problems relates to the desirability of varying such things as the sensitivity and stiffness of the system. For certain conditions of operation it may be desirable to make the suspension system highly sensitive. At the same time, high sensitivity may not be desired for other conditions of operation, and particularly when an active suspension system is first turned on. It is preferable to allow the operator at least some time to become accustomed to the suspension system before a state of high responsiveness is entered. It is also generally desirable to be able to vary the rate at which the seat is moved in response to the sensor and, thereby, the stiffness of the suspension system. Different types of rides and bumpy conditions dictate different degrees of stiffness desired in the suspension system for optimum operator comfort.

Therefore, there is a need in the art for a seat suspension system that can be fully adjusted, and which, preferably does not implement a hydraulic pump. It is toward such a seat suspension system, and the manufacturing of such a seat suspension system, that embodiments of the present invention are directed.

SUMMARY

In one aspect, various embodiments of the present invention include a suspension system, for example, for the seat of a utility vehicle. The suspension system can comprise a support assembly, a regulating system, and a control system. The support assembly supports the seat, and can be adjusted by actions of the regulating system. In an exemplary embodiment, the support assembly comprises a pair of crossed supports, and the regulating system comprises a rotary motor. The rotary motor can drive the supports by means of a belt or gears. Together, the regulating system and support assembly can emulate a range of suspension stiffnesses.

The regulating system's actions can be determined by the control system, which can comprise sensors, a software control, and a hardware control. The hardware control can be the means by which a human operator can select the stiffness of the suspension, or can indicate whether the suspension system should be passive, semi-active, or active. Taking input from the hardware control and the sensors, the software control directs the regulating system to adjust the support system as is necessary to meet the human operator's chosen settings.

These and other objects, features, and advantages of the present invention will become more apparent upon reading the following specification in conjunction with the accompanying drawing figures.

BRIEF DESCRIPTION OF THE FIGURES

FIG. 3 illustrates a side view of the agricultural tractor in accordance with an exemplary embodiment of the present invention.

FIG. 4 illustrates a rear view of the agricultural tractor in accordance with an exemplary embodiment of the present invention.

DETAILED DESCRIPTION OF PREFERRED EMBODIMENTS

Figure 1:
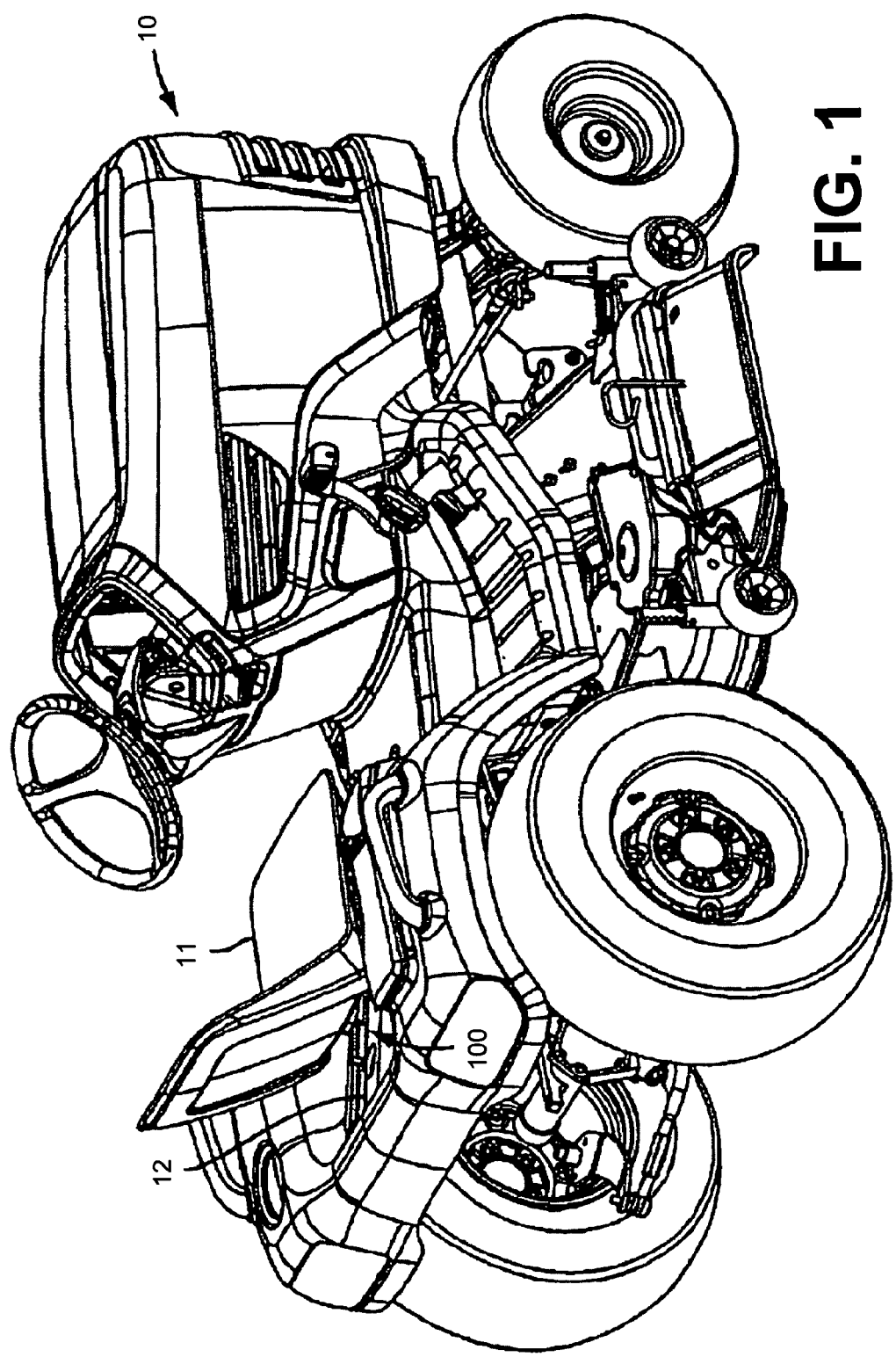
FIG. 1 illustrates a perspective view of an agricultural tractor in accordance with an exemplary embodiment of the present invention.

To facilitate an understanding of the principles and features of the invention, it is explained hereinafter with reference to its implementation in an illustrative embodiment. In particular, the invention is described in the context of being a motor-powered suspension system for a utility vehicle seat.

The invention, however, is not limited to a motor-powered suspension system for a vehicle seat. Rather, the invention need not be motor-powered and can be used whenever a suspension system is desired, including for a seat for any type of vehicle. Thus, the device described hereinafter as a motor-powered suspension system for a utility vehicle seat can also find utility as a device for other applications, beyond that of inserting utility flags into the ground.

Though described herein based on figures as "up," "down," and "vertical" one skilled in the art would appreciate that these terms relate to movement in the same plane. That is to say that the present invention contemplates movement at vertical, horizontal, and angled trajectories, as desired. Thus, when the terms "up," "down," and "vertical" are used herein, they are only exemplary embodiments and are meant to identify movement in opposite directions in the same plane.

The materials described hereinafter as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

In one aspect, various embodiments of the present invention include a suspension system, preferably for the seat of a utility vehicle. The seat suspension system can be used in a tractor, a farm vehicle, a construction vehicle, a motorcycle, or many other vehicles that might benefit from a seat suspension system.

Referring now to the figures, wherein like reference numerals represent like parts throughout the view, the present invention will be described in detail. The present invention comprises a suspension system.

FIG. 1 illustrates a vehicle, specifically a vehicle 10, specifically, an agricultural tractor, in accordance with an exemplary embodiment of the suspension system. The vehicle 10 includes a vehicle sitting area supported on a seat suspension system 100, which is mounted on a vehicle chassis 12. The sitting area can be a seat 11.

Figure 2:
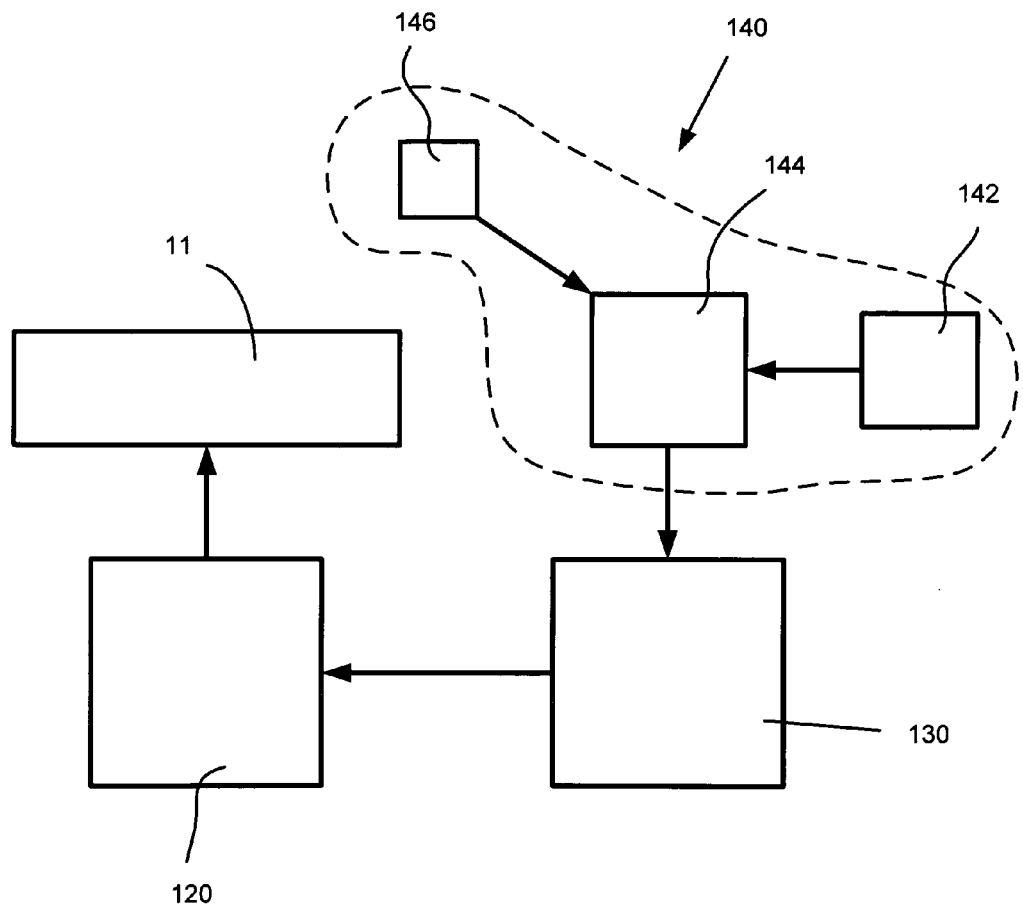
FIG. 2 illustrates a block diagram of interaction of various elements of an exemplary embodiment of the present invention.

FIG. 2 illustrates a block diagram of interactions of various elements of an exemplary embodiment of the suspension system. In an exemplary embodiment, the seat suspension system 100 comprises a support assembly 120 supporting the seat 11, a regulating system 130, and a control system 140.

The support assembly 120 comprises elements that secure the vehicle seat in an upright position. While the support assembly 120 can be located directly underneath the sitting area 11 this is not required. The support assembly 120 need not be underneath, or even vertically in line with, the sitting area 11. If the support assembly 120 is located underneath the sitting area 11, there can be intermediate elements between the support assembly 120 and the sitting area 11. The number and type of intermediate elements can depend on the type of vehicle incorporating a suspension system of the present invention.

The regulating system 130 regulates the support assembly 120. The regulating system 130 comprises some means for causing the support assembly 120 to move the sitting area 11 with respect to the support assembly 120 base. In conjunction with the support assembly 120 and the control system 140, the regulating system 130 is capable of emulating a range of spring constants, and therefore suspension stiffnesses, and at any one time, the regulating system 130 can create a passive, semi-active, or active suspension system.

The control system 140 controls the regulating system 130. The control system 140 can comprise a hardware control 142, a software control 144, and a sensor 146, such as a vibrometer. An operator operates the hardware control 142 to adjust the settings of the suspension system 100. The operator can be human, a device, or a system. With the hardware control 142, the operator may be able to choose between a passive, semi-active, and active suspension system. Additionally, the operator can set the suspension system 100 to any desired stiffness. The hardware control 142 is preferably interfaced with the software control 144. Based on the settings selected by means of the hardware control 142, the software control 144 can determine how the support assembly should be adjusted to best comply with the settings of the suspension system 100. The software control 144 can also be interfaced with the regulating system 130, and can instruct the regulating system 130 to adjust the support assembly as needed. The software control 144 is also interfaced with the sensor 146, which sensor 146 senses conditions of the tractor. The sensor 146 can report movement, vibration, vertical angle, or any information can be useful for regulating a suspension system 100. Based at least on information from the sensor 146 and from the hardware control 142, the software control 144 can determine how the support assembly should be adjusted to maintain the operator's selected settings.

FIGS. 3-4 illustrate side and rear views of a vehicle. The vehicle 10 includes a frame or chassis 12, an operator's cab 13 supported above chassis 12, and a seat or dual seats 11 within the cab 13. As the vehicle 10 is propelled along a surface 5, wheels 14 and 15 may encounter uneven areas 6. The suspension system 100 keeps the human operator comfortable on the seat 11 by providing stable control of movement responsive to pitch, roll, and bounce.

The control system 140 of the suspension system 100 can comprise multiple sensors 142. In some work vehicle applications, the suspension system 100 includes a forward-looking sensor 142a mounted to vehicle 10 to detect the bumpiness level on the surface 5 forward of the vehicle 10. The sensor 142a can comprise a radar to detect bumpiness based on the time needed for electromagnetic signals to travel from sensor 142a to surface 5, and then reflect back. Alternatively or additionally, sensor 142a can include a vision-based or proximity sensor, such as a micropower impulse radar (MIR) device. The sensor 142a can be mounted to the vehicle 10 and oriented toward surface 5. Additionally or alternatively, a sensor can be mounted on the hood of vehicle 10, mounted below the vehicle 10 to detect bumpiness forward of rear wheels 15, or a sensor 142b can be mounted forward of front wheels 14.

In some utility vehicle applications, the suspension system 100 can include a leveling sensor 142c mounted to cab 13 to generate signals indicative of the degree to which the attitude of cab 13 is level relative to horizontal. The leveling sensor 142c can include a gyroscope or electronic level signal generator, and the sensor can be mounted at the center of gravity of cab 13. The signal from that sensor 142c can be used to control the attitude of cab 13 and to maintain a level attitude. The suspension system 100 can further include a movement sensor 142d (e.g., a three-axis accelerometer) mounted adjacent to an operator's torso or head, optionally supported by a headrest of seat 11, to accurately sense the movement felt by the operator. A signal from the sensor 142d can be used as a primary or secondary control input to more accurately control the movement of cab 13 and its effect on the operator. The suspension system 100 can also include several accelerometers mounted to cab 13. All above the above mentioned signals can be used as input to the software control 144.

Components of other vehicle systems within cab 13 can include a steering angle sensor coupled to the wheels 15 to generate a signal representing steering angle, and brake detecting sensors coupled to brake pedals to detect application of the service brakes. The brake-detecting sensors can be coupled directly to the brakes. The signals generated by these sensors are supplemental control inputs used by the suspension system 100 to counteract movement of the cab 13 due to forces applied to chassis 12 when turning or braking.

Figure 5:
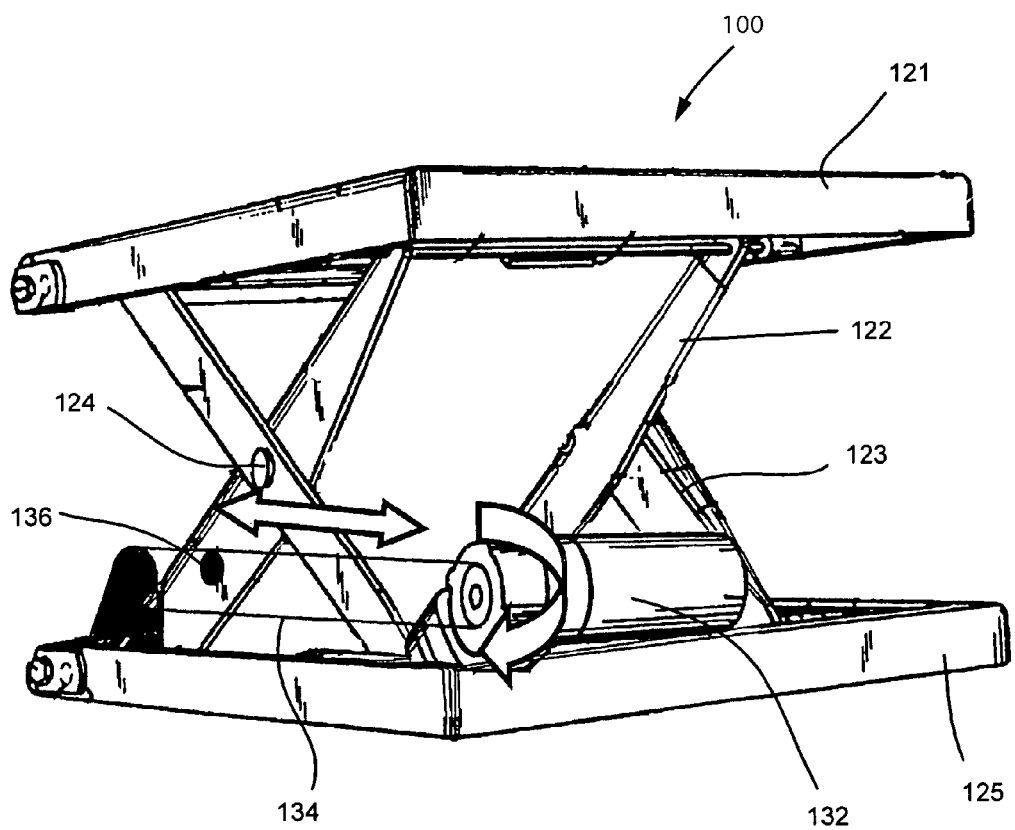
FIG. 5 illustrates a portion of a seat suspension system in accordance with an exemplary embodiment of the present invention.

FIG. 5 illustrates a portion of the seat suspension system. In one embodiment, the support assembly 100 is located beneath the sitting area, so the support assembly top surface 121 is underneath the seat 11, although there can exist intermediate material between the top surface 121 and the seat 11. The support assembly comprises two supports, a first support 122 and a second support 123. The supports, or arms, can be of many implementations, for example not limitation, including beams of any width, or shafts. Each support can have an upper portion and a lower portion, and the supports are, preferably, pivotally connected at a junction 124, which lies at intermediate points of the first support 122 and second support 123. The supports 122, 124 can cross, creating an X-shape. The suspension assembly 100 can also comprise a base 125. The supports 122, 124 are mounted on the base 125 and extend upward to connect to the top surface 121, which can be the underside of the seat 11 in some embodiments. More specifically, in one embodiment, the upper portion of the first support 122 is pivotally connected to the top surface 121, while the upper portion of the second support 123 is slidably connected to the top surface 121. The lower portion of the first support 122 is slidably connected to the base 125, and the lower portion of the second support 123 is pivotally connected to the base 125. This arrangement of connections allows one side of the supports to slide away from, or toward, each other, thereby causing the X-shape to contract vertically or horizontally and, as a result, causing sitting area to move vertically with respect to the base 125.

In a different embodiment (not shown), the support assembly 100 can comprise a bladder that can hold a range of volumes of a medium, such as air or liquid, where the bladder is located under the sitting area. When the value in the bladder is increased, a stiffer support results. In contrast, when the volume in the bladder is decreased, the stiffness of the suspension system decreases.

Referring back to FIG. 5, the regulating system 130 can comprise an energy-converter and an optional energy-transferring assembly. Actions of the regulating system 130 can cause adjustments in the support assembly 120, thereby causing the seat to move vertically with respect to the base. The energy converter 132 can convert electrical energy to mechanical energy. The energy-transferring assembly should transfer the mechanical energy output by the motor to the support assembly 120, thereby causing the support assembly 120 to move the sitting area accordingly. In the depicted embodiment, the energy-converter 132 is a rotary motor 132, and the energy-transferring assembly comprises a belt 134 connected to the motor 132 and also connected, by means of a pin 136, to one of the supports. The motor 132 drives the belt 134, and the belt 134 and pin 136 cause the supports to move. Alternatively, the energy-transferring assembly can comprise one or more gears, which are driven by the motor 132 and which drive the supports of the support assembly, causing such supports to vertically move the sitting area.

In an alternative embodiment, where the support assembly comprises a bladder of gas or liquid, the regulating system can comprise a pump, and the energy-transferring assembly can comprise a tube or nozzle through which liquid or air passes between the bladder and the pump.

As discussed above, the control system (not shown) can comprise one or more sensors 142, a software control 144, and a hardware control 146. Given input from the sensors 142 and the hardware control 146, the software control 144 directs the regulating system 130 on how to adjust the support assembly 120. Where the regulating system 130 comprises a rotary motor 132, the software control 144 directs the motor 132 to rotate in one direct or the other to emulate a certain spring constant, or stiffness, or to react to actively react to the sensor's input in the manner of an active suspension system. Where the regulating system 130 comprises a pump for gas or liquid, the control system 140 directs the pump to push or suck gas or liquid to achieve a similar effect.

While the invention has been disclosed in exemplary forms, it will be apparent to those skilled in the art that many modifications, additions, and deletions can be made therein without departing from the spirit and scope of the invention and its equivalents, as set forth in the following claims.

What is claimed is:

1. A vehicle seat suspension assembly comprising:
 a seat;
 a base;
 a support assembly mounted to the base and supporting the seat;
 a regulating system, which regulates the support assembly, wherein actions of the regulating system cause adjustment in the support assembly, thereby causing the seat to move vertically with respect to the base; and
 an energy transferring assembly, which transfers energy between the regulating system and the support assembly, thereby allowing the regulating system to adjust the support assembly wherein the regulating system comprises a rotary motor; and
 wherein the regulating system in conjunction with the support assembly is capable of emulating a range of spring constants and which, at anyone time, effects one of passive, semi-active, and active suspension systems, wherein the support assembly comprises first and second supports, wherein the energy-transferring assembly comprises a belt connected to one of the first and second supports, and wherein the rotary motor drives the belt, thereby adjusting the support assembly.

2. The vehicle seat suspension assembly of claim 1, further comprising a sensor, which detects motion of the vehicle; and wherein the regulating system's regulation of the support assembly is based on, at least, output of the sensor.

3. The vehicle seat suspension assembly of claim 2, further comprising a software control, which controls the behavior of the regulating system based on, at least, output of the sensor.

4. The vehicle seat suspension assembly of claim 3, further comprising a hardware control;
wherein the software control is interfaced with the hardware control, such that the software control controls the behavior of the regulating system in accordance with a human operator's operation of the hardware control.

5. The vehicle seat suspension assembly of claim 1, further comprising:
the first support having an upper portion and a lower portion; and
the second support having an upper portion and a lower portion, the second support pivotally connected to and crossing the first support at intermediate parts of the first support and the second support.

6. The vehicle seat suspension of claim 5, further comprising:
a top surface;
wherein the upper portion of the first support is pivotally connected to the top surface; wherein the lower portion of the first support is slidably connected to the base; wherein the upper portion of the second support is slidably connected to the top surface; and wherein the lower portion of the second support is pivotally connected to the base.

7. A method of manufacturing a vehicle seat suspension assembly, the method comprising:
providing a seat;
providing a base;
providing a top surface;
mounting a support assembly on the base such that the support assembly supports the seat;
connecting a regulating system to the support assembly, wherein the regulating system regulates the support assembly, and wherein actions of the regulating system cause adjustment in the support assembly, thereby causing the seat to move vertically with respect to the base; and
providing an energy-transferring assembly for transferring energy between the regulating system and the support assembly, thereby allowing the regulating system to adjust the support assembly, wherein the regulating system comprises a rotary motor and the regulating system in conjunction with the support assembly is capable of emulating a range of spring constants and which, at anyone time, effects one of passive, semi-active, and active suspension systems, wherein the support assembly comprises first and second supports, wherein the energy-transferring assembly comprises a belt connected to one of the first and second supports, and wherein the rotary motor drives the belt, thereby adjusting the support assembly.

8. The method of claim 7 further comprising:
providing a sensor for detecting motion of the vehicle, wherein the regulating system's regulation of the support assembly is based on, at least, output of the sensor.

9. The method of claim 8 further comprising:
providing a software control for controlling the behavior of the regulating system based on, at least, output of the sensor.

10. The method of claim 9 further comprising:
providing a hardware control, wherein the software control is interfaced with the hardware control, such that the software control controls the behavior of the regulating system in accordance with a human operator's operation of the hardware control.

11. The method of claim 7 further comprising:
providing the first support having an upper portion and a lower portion;
providing the second support having an upper portion and a lower portion; and
positioning the second support so that it is pivotally connected to and crossing the first support at intermediate parts of the first support and the second support.

12. The method of claim 11 wherein the first support has an upper portion and a lower portion;
wherein the lower portion of the first support is slidably connected to the base;
wherein the upper portion of the second support is slidably connected to the top surface; and wherein the lower portion of the second support is pivotally connected to the base.

* * * * *